United States Patent
Kawasaki

(10) Patent No.: US 9,995,634 B2
(45) Date of Patent: Jun. 12, 2018

(54) LASER FREQUENCY MEASUREMENT METHOD AND DEVICE USING OPTICAL FREQUENCY COMB

(71) Applicant: MITUTOYO CORPORATION, Kawasaki-shi, Kanagawa (JP)

(72) Inventor: Kazuhiko Kawasaki, Ibaraki (JP)

(73) Assignee: MITUTOYO CORPORATION, Kawasaki-Shi (JP)

(*) Notice: Subject to any disclaimer, the term of this patent is extended or adjusted under 35 U.S.C. 154(b) by 53 days.

(21) Appl. No.: 14/791,825

(22) Filed: Jul. 6, 2015

(65) Prior Publication Data

US 2016/0011055 A1    Jan. 14, 2016

(30) Foreign Application Priority Data

Jul. 10, 2014   (JP) ................. 2014-141965

(51) Int. Cl.
   *G01J 9/04* (2006.01)
   *H01S 3/13* (2006.01)

(52) U.S. Cl.
   CPC .............. *G01J 9/04* (2013.01); *H01S 3/1305* (2013.01); *G02F 2203/54* (2013.01)

(58) Field of Classification Search
   CPC ......... G01J 9/04; G01J 9/0246; G02F 1/0121; G02F 2203/56; G02F 2203/54; H01S 3/13; H01S 3/1305
   See application file for complete search history.

(56) References Cited

U.S. PATENT DOCUMENTS

| 7,324,208 B2 | 1/2008 | Niki | |
| 8,446,592 B1* | 5/2013 | Arissian | G01B 9/02003 |
| | | | 356/484 |
| 2007/0024855 A1* | 2/2007 | Niki | G01J 9/04 |
| | | | 356/451 |
| 2008/0100281 A1* | 5/2008 | Peng | G01J 9/04 |
| | | | 324/76.41 |

(Continued)

FOREIGN PATENT DOCUMENTS

| JP | 2007-256365 | 10/2007 |
| JP | 2013-072848 | 4/2013 |

(Continued)

OTHER PUBLICATIONS

Holger Hundertmark, Phase-locked carrier-envelope-offset frequency at 1560nm, Mar. 8, 2004, Optics Express, vol. 12, pp. 770-775.*

(Continued)

*Primary Examiner* — Michael P Lapage
(74) *Attorney, Agent, or Firm* — Rankin, Hill & Clark LLP

(57) ABSTRACT

To measure the frequency of a laser, the frequency of a beat signal that is generated by the interference between an optical frequency comb, used as the reference of measurement, and the laser to be measured is measured. In such a laser frequency measurement using the optical frequency comb, at least one of a repetition frequency and a CEO frequency of the optical frequency comb is changed so that the frequency of the beat signal becomes a predetermined value, and the frequency of the beat signal is measured, so that the frequency of the laser is measured. This allows measurement of the frequency of laser having large frequency variation and low stability.

11 Claims, 7 Drawing Sheets

(56) References Cited

U.S. PATENT DOCUMENTS

2009/0097035 A1* 4/2009 Peng .................... G01J 9/00
356/459

FOREIGN PATENT DOCUMENTS

| WO | WO2005/093385 | 10/2005 |
| WO | 2015/191690 | 12/2015 |

OTHER PUBLICATIONS

H. Inaba, Y. Nakajima, F.L. Hong, K. Mianoshima, J. Ishikawa, A.Onae, H. Matsumoto, M. Wouters, B. Warrington, and N. Brown, "Frequency Measurement Capability of a Fiber-Based Frequency Comb at 633nm", IEEE Transactions on Instrumentation and Measurement, vol. 58, pp. 1234-1240, Apr. 2009, (Discussed in specification, English text).
Japanese Office Action dated Apr. 10, 2018, Application No. 2014-141965, and English translation, 7 pages.

\* cited by examiner

PRIOR ART

BEAT FREQUENCY AND MEASURABLE FREQUENCY
RANGE THEREOF

BEAT FREQUENCY VARIES TO $f_B'$

BEAT FREQUENCY AFTER ADJUSTMENT
OF $f_{rep}$ or $f_{CEO}$

LASER FREQUENCY MEASUREMENT METHOD AND DEVICE USING OPTICAL FREQUENCY COMB

CROSS-REFERENCE TO RELATED APPLICATION

The disclosure of Japanese Patent Application No. 2014-141965 filed on Jul. 10, 2014 including specifications, drawings and claims is incorporated herein by reference in its entirety.

TECHNICAL FIELD

The present invention relates to a laser frequency measurement method and device using an optical frequency comb. More specifically, the present invention relates to a laser frequency measurement method and device using an optical frequency comb that can measure the frequency of a laser having large frequency variation and low stability.

BACKGROUND ART

To measure a laser frequency, a method of using an optical frequency comb device is proposed in recent years. For example, as described in Japanese Patent Application Laid-Open No. 2007-256365 (hereinafter called Patent Literature 1), the use of the optical frequency comb device facilitates measurement of the oscillation frequency of a laser with high accuracy. This optical frequency comb device is a device that outputs a laser having a comb-shaped spectrum with a repetition frequency (longitudinal mode spacing) of $f_{rep}$, and has the property of having the precisely equal $f_{rep}$ in any frequency band. (See, for example, H. Inaba, Y. Nakajima, F. L. Hong, K. Minoshima, J. Ishikawa, A. Onae, H. Matsumoto, M. Wouters, B. Warrington, and N. Brown, "Frequency Measurement Capability of a Fiber-Based Frequency Comb at 633 nm," IEEE Transactions on Instrumentation and Measurement, vol. 58, pp. 1234-1240, April 2009, which is hereinafter called Non-Patent Literature 1.)

FIG. 1 shows the frequency spectra of an optical frequency comb (also called optical comb) and a laser to be measured.

An oscillation frequency $v_n$ in the n-th comb mode of the optical comb can be represented by the following formula:

$$v_n = n \cdot f_{rep} + f_{CEO} \quad (1).$$

In the formula, $f_{CEO}$ represents a carrier envelope offset frequency (hereinafter called CEO frequency), and "n" represents a mode order that indicates the number of an order of a mode with setting an initial mode as the 0-th mode.

Here, by interference between the laser to be measured (having a frequency of $v_{laser}$) and the optical comb, a frequency difference $f_B$ therebetween is observed as a beat signal, as represented by the following formula (2):

$$f_B = v_{laser} - v_n \quad (2).$$

Thus, the frequency $v_{laser}$ can be obtained by the following formula (3) using the formulas (1) and (2):

$$v_{laser} = n \cdot f_{rep} + f_{CEO} + f_B \quad (3).$$

Therefore, if the repetition frequency $f_{rep}$ and the CEO frequency $f_{CEO}$ of the optical frequency comb are synchronized with a standard frequency (for example, a frequency synchronized with coordinated universal time) and the beam frequency $f_B$ is measured, it is possible to accurately measure (calculate) the absolute frequency $v_{laser}$ of the laser to be measured by setting the appropriate integer "n".

FIG. 2 is a schematic view of a spectrum of a beat frequency signal that occurs when a photodetector receives the interference between the optical frequency comb and the laser to be measured. The beat frequency signal has peaks at the repetition frequency $f_{rep}$ by the interference among the modes of the optical frequency comb itself and a frequency $f_{B'}$ ($=f_{rep} - f_B$) conjugate to the beat frequency $f_B$, in addition to a peak at the beat frequency $f_B$ to be measured. Moreover, relative to fundamentals of these three frequencies, a harmonic occurs repeatedly at every frequency of $f_{rep}$. Therefore, in order to measure the beat frequency $f_B$ with high accuracy, it is required to cut off unnecessary frequency components other than the beat frequency $f_B$ by using a band pass filter (BPF) for an RF frequency signal.

SUMMARY OF INVENTION

Technical Problem

The band pass filter extracts frequency signal in a frequency band that depends on specifications of each part. For example, a band pass filter for extracting a frequency component of 30 MHz generally passes frequency signal having a frequency of the order of 30 MHz±3 MHz. In this case, if the beat frequency $f_B$ to be measured varies by 3 MHz or more, the beat frequency $f_B$ is cut off by the band pass filter and cannot be measured.

Accordingly, it becomes difficult to measure the frequency of an inexpensive stable laser often used in an industrial field in which the oscillation frequency of the laser is simply stabilized by temperature control or the like. In other words, the optical frequency comb device is just a device specific to measurement of the frequency of such a laser of great accuracy that is stabilized in a molecule absorption line.

The present invention has been made in order to solve the above-described problem in the conventional technique, and an object thereof is to measure the frequency of a laser having large frequency variation and low stability, which is hard to measure in the conventional technique.

Solution to Problem

To solve the above problem, according to the present invention, in a laser frequency measurement method using an optical frequency comb, in which the frequency of a laser is measured by measuring a frequency of a beat signal generated by the interference between the optical frequency comb, used as the reference of measurement, and the laser to be measured, at least one of a repetition frequency $f_{rep}$ and a CEO frequency $f_{CEO}$ of the optical frequency comb is changed such that the frequency of the beat signal becomes a predetermined value, and the frequency of the laser is measured by measuring the frequency of the beat signal.

Here, the repetition frequency $f_{rep}$ and the CEO frequency $f_{CEO}$ may be measured, and at least one of the repetition frequency $f_{rep}$ and the CEO frequency $f_{CEO}$ may be changed such that the frequency of the beat signal becomes the predetermined value.

Furthermore, an absolute frequency $v_{laser}$ of the laser may be measured from measurement values of the repetition frequency $f_{rep}$ and the CEO frequency $f_{CEO}$, and the predetermined value or measured value of the beat signal.

Also, the repetition frequency $f_{rep}$ may be stabilized by phase synchronization with an $f_{rep}$ reference frequency, which is generated for stabilization of the repetition frequency $f_{rep}$, and the CEO frequency $f_{CEO}$ may be stabilized by phase synchronization with an $f_{CEO}$ reference frequency, which is generated for stabilization of the CEO frequency $f_{CEO}$. Also, at least one of the $f_{rep}$ reference frequency and the $f_{CEO}$ reference frequency may be changed such that the frequency of the beat signal becomes the predetermined value.

Also, the repetition frequency $f_{rep}$ may be stabilized by phase synchronization with the $f_{rep}$ reference frequency, which is generated for stabilization of the repetition frequency $f_{rep}$, and the CEO frequency $f_{CEO}$ may be measured and changed such that the frequency of the beat signal becomes the predetermined value to measure the oscillation frequency of the laser.

The reference frequencies may be generated by using a frequency synthesizer.

The present invention provides a laser frequency measurement device using an optical frequency comb, in which the frequency of a laser is measured by measuring a frequency of a beat signal generated by the interference between the optical frequency comb, used as the reference of measurement, and the laser to be measured. The laser frequency measurement device includes means for changing at least one of a repetition frequency $f_{rep}$ and a CEO frequency $f_{CEO}$ of the optical frequency comb such that the frequency of the beat signal becomes a predetermined value, and means for measuring the frequency of the beat signal to measure the frequency of the laser.

Here, the laser frequency measurement device may include means for measuring the repetition frequency $f_{rep}$, means for measuring the CEO frequency $f_{CEO}$, and means for changing at least one of the repetition frequency $f_{rep}$ and the CEO frequency $f_{CEO}$ such that the frequency of the beat signal becomes the predetermined value.

Furthermore, the laser frequency measurement device may include means for measuring an absolute frequency $v_{laser}$ of the laser from measurement values of the repetition frequency $f_{rep}$ and the CEO frequency $f_{CEO}$, and the predetermined value or measured value of the beat signal.

Also, the laser frequency measurement device may include means for stabilizing the repetition frequency $f_{rep}$ by phase synchronization with an $f_{rep}$ reference frequency, which is generated for stabilization of the repetition frequency $f_{rep}$, means for stabilizing the CEO frequency $f_{CEO}$ by phase synchronization with an $f_{CEO}$ reference frequency, which is generated for stabilization of the CEO frequency $f_{CEO}$, and means for changing at least one of the $f_{rep}$ reference frequency and the $f_{CEO}$ reference frequency such that the frequency of the beat signal becomes the predetermined value.

Also, the laser frequency measurement device may include means for stabilizing the repetition frequency $f_{rep}$ by phase synchronization with the $f_{rep}$ reference frequency, which is generated for stabilization of the repetition frequency $f_{rep}$, means for measuring the CEO frequency $f_{CEO}$, and means for changing the CEO frequency $f_{CEO}$ such that the frequency of the beat signal becomes the predetermined value.

Also, the laser frequency measurement device may include means for generating the reference frequencies by using a frequency synthesizer.

Advantageous Effects of Invention

According to the present invention, when the beat frequency varies out of the predetermined range, stabilization control is performed by changing one or both of the repetition frequency $f_{rep}$ and the CEO frequency $f_{CEO}$ of the optical frequency comb in the direction of compensating a variation of the beat frequency. Therefore, it is possible to measure the frequency of a laser that varies in a wide range, irrespective of limitations of a band of a band pass filter, which is used in measurement of the beat frequency. This configuration can achieve the measurement of the frequency of an inexpensive stable laser, which is often used in an industrial field.

These and other novel features and advantages of the present invention will become apparent from the following detailed description of preferred embodiments.

BRIEF DESCRIPTION OF DRAWINGS

The preferred embodiments will be described with reference to the drawings, wherein like elements have been denoted throughout the figures with like reference numerals, and wherein.

DESCRIPTION OF EMBODIMENTS

Embodiments of the present invention will be described below in detail with reference to the drawings. Note that, the present invention is not limited to descriptions of the below embodiments and practical examples. Components of the embodiments and the practical examples described below contain what is easily assumed by those skilled in the art, what is substantially the same, and what is in a so-called equivalent scope. Moreover, the components disclosed in the embodiments and the practical examples described below may be appropriately combined with each other or appropriately selectively used.

Figure 3:
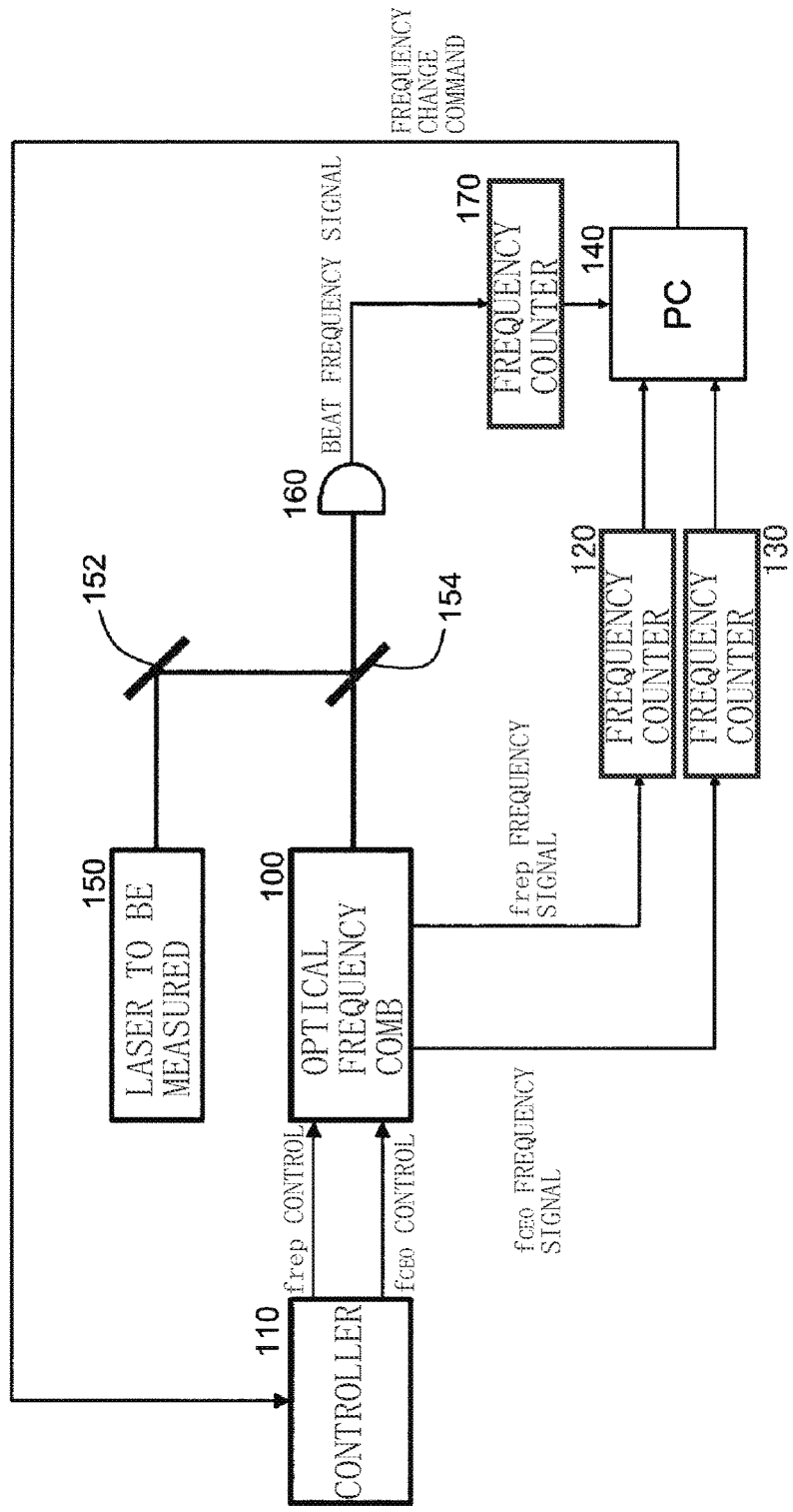
FIG. 3 is a block diagram showing the configuration of a first embodiment of the present invention.

FIG. 3 shows a first embodiment of a laser frequency measurement device using an optical frequency comb according to the present invention.

An optical frequency comb 100 is stabilized by an $f_{rep}$ control signal and an $f_{CEO}$ control signal from a controller 110. A frequency counter 120 measures a stabilized repetition frequency $f_{rep}$, and a frequency counter 130 measures a stabilized CEO frequency $f_{CEO}$. A personal computer (PC) 140 receives measurement values thereof, and monitors the oscillation frequency of the optical frequency comb 100.

A photodetector 160 detects a beat signal generated by a laser 150 to be measured and the optical frequency comb 100. A frequency counter 170 measures the frequency of the beat signal, and the PC 140 receives a measurement value thereof.

Then, when the beat frequency exceeds a predetermined range, a frequency change command is sent to the controller 110, so that the controller 110 sends the $f_{rep}$ control signal and/or the $f_{CEO}$ control signal to the optical frequency comb 100.

In the drawing, a reference numeral 152 refers to a mirror, and a reference numeral 154 refers to a half mirror.

Figure 4:
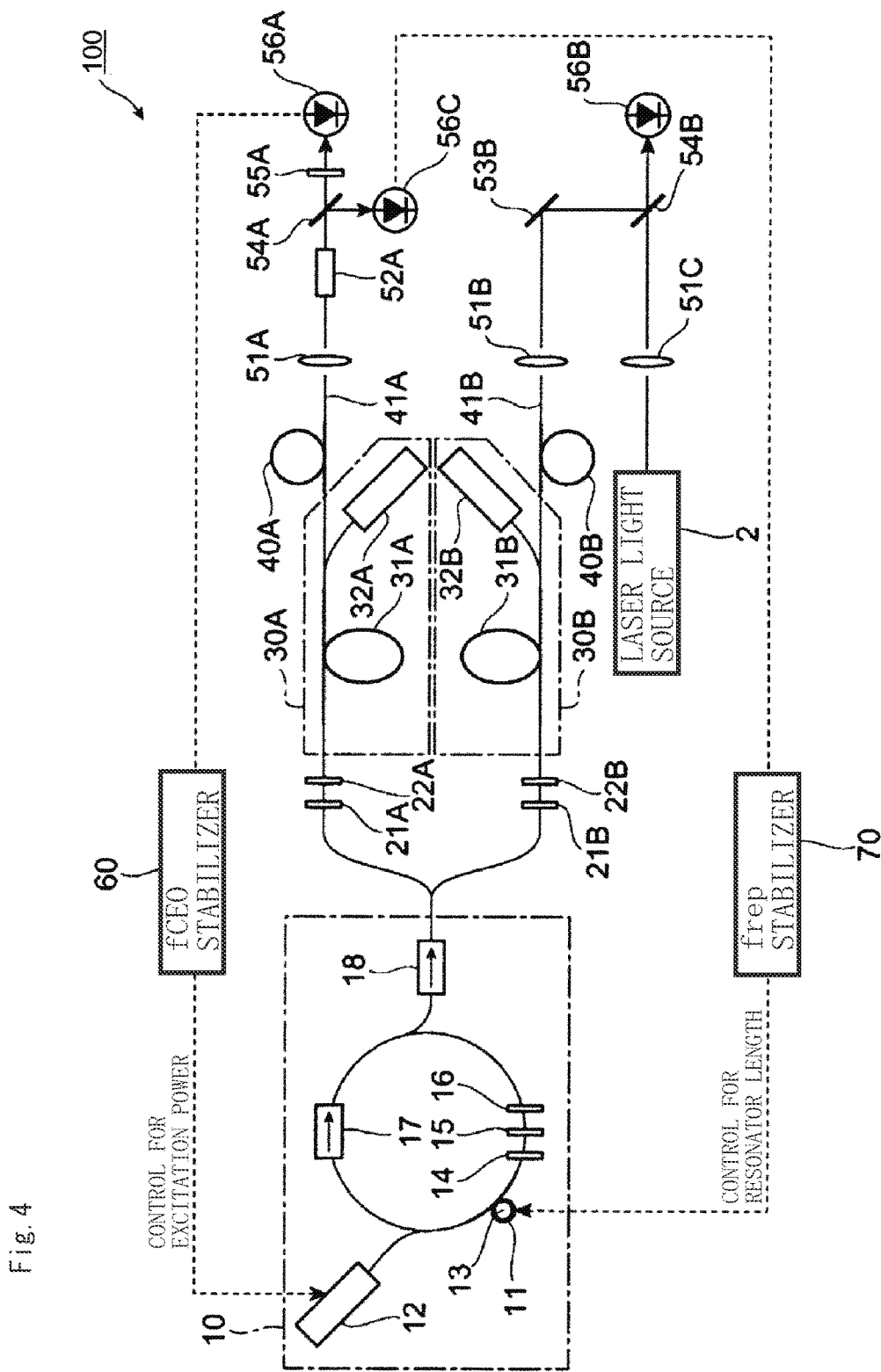
FIG. 4 is a drawing of an example of the optical frequency comb used in the first embodiment.

An example of the optical frequency comb 100 will be described with reference to FIG. 4, which cites FIG. 1 of Patent Literature 1. In an optical frequency comb oscillator 10, first, light excited by an LD (laser diode) 12 generates in a ring resonator a laser that supports a plurality of longitudinal modes. Then, by adjusting a plane of polarization of the laser orbiting in the ring resonator with the use of polarizing elements (14, 15, and 16), such as a wave plate and a polarizing plate disposed in the ring resonator, phase synchronization among the plurality of longitudinal modes occurs, and a pulsed laser is generated. The frequency spectrum of the pulsed laser at this time is in the shape of a comb having a repetition frequency of $f_{rep}$. The repetition frequency $f_{rep}$ can vary by varying the length of the resonator. Thus, in a technique of FIG. 4, the repetition frequency $f_{rep}$ is changed by adjustment of an extension amount of an optical fiber 11 by a PZT 13. On the other hand, the CEO frequency $f_{CEO}$ can vary by varying the excitation power, and hence is controlled by changing an injected current from a driver to the LD 12.

In the drawing, a reference numeral 2 refers to a laser light source. Reference numerals 17 and 18 each refer to an optical isolator. Reference numerals 21A and 21B each refer to a λ/4 plate. Reference numerals 22A and 22B each refer to a λ/2 plate. Reference numerals 30A and 30B each refer to an optical fiber amplifier. Reference numerals 31A and 31B each refer to an optical fiber for amplification. Reference numerals 32A and 32B each refer to an excitation light source. Reference numerals 40A and 40B each refer to a highly-non-linear optical fiber. Reference numerals 41A and 41B each refer to a single mode optical fiber. Reference numerals 51A, 51B and 51C each refer to a lens. A reference numeral 52A refers to a non-linear optical medium. A reference numeral 53B refers to a mirror. Reference numerals 54A and 54B each refer to a half mirror. A reference numeral 55A refers to a band pass filter. A reference numeral 56A refers to a CEO frequency detector. A reference numeral 56B refers to a heterodyne detector. A reference numeral 56C refers to a repetition frequency detector. A reference numeral 60 refers to a CEO frequency stabilizer. A reference numeral 70 refers to a repetition frequency stabilizer.

In an optical frequency comb disclosed in Patent Literature 1, the CEO frequency stabilizer 60 and the repetition frequency stabilizer 70 are used for stabilizing the frequencies. However in this embodiment, the CEO frequency stabilizer 60 and the repetition frequency stabilizer 70 are used in an opposite manner to change the frequencies.

Figure 5A:
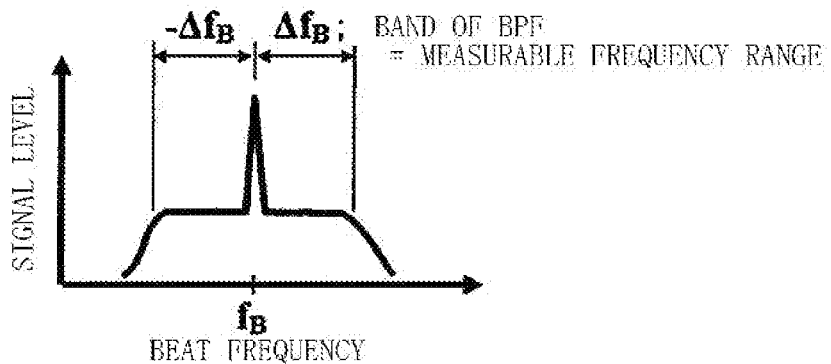
FIGS. 5A to 5C are graphs showing a spectrum of the beat frequency signal after passing through a band pass filter in the first embodiment.

In this embodiment, if the oscillation frequency of the laser 150 varies and the beat frequency exceeds, or is likely to exceed, the measurable frequency range (in a case where a state of FIG. 5A is changed to a state of FIG. 5B, which schematically show spectra of the beat frequency signal), the PC 140 sends the oscillation frequency change command. In response to the command, the controller 110 sends the $f_{rep}$ and/or $f_{CEO}$ control signals, to perform frequency control so as to compensate a variation of the beat frequency $f_B$.

Figure 1:
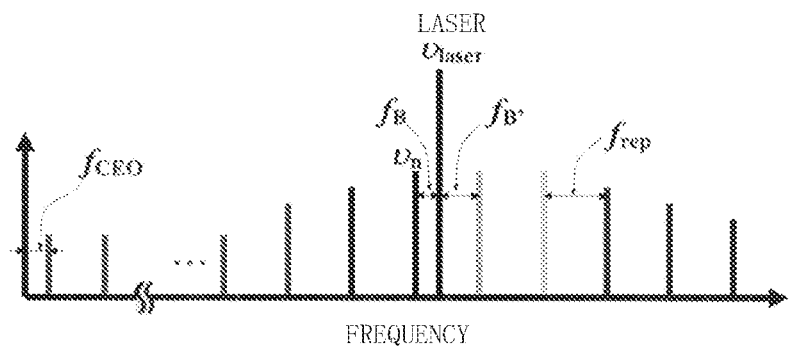
FIG. 1 is a graph showing examples of spectra of an optical frequency comb and a laser.
Figure 2:
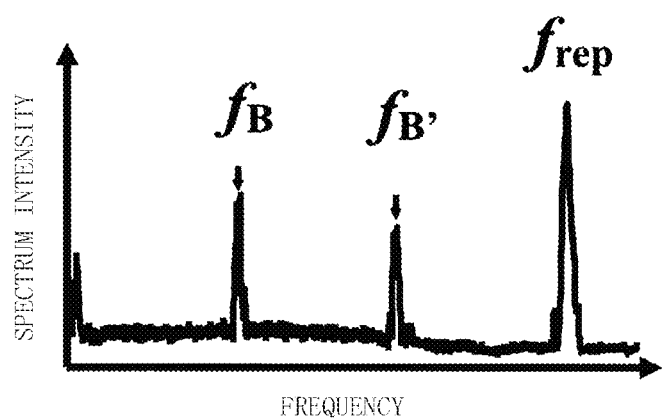
FIG. 2 is a graph showing an example of a spectrum of a beat frequency signal.
Figure 5B:
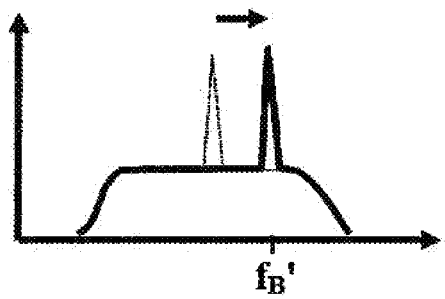
Figure 5C:
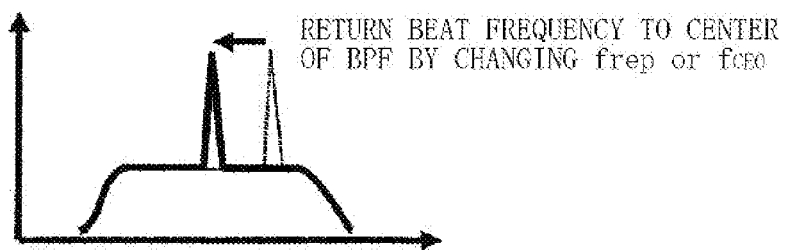

Taking a beat frequency that is generated by the interference between the optical frequency comb and the laser to be measured having the spectra of FIG. 1 as an example, if the beat frequency $f_B$ increases due to increase in the frequency $v_{laser}$, the repetition frequency $f_{rep}$ is increased or the CEO frequency $f_{CEO}$ is increased under control, so that the beat frequency $f_B$ is changed to be in the predetermined range, for example, returned to the center of the BPF. In the spectrum of the beat frequency, the state of FIG. 5B is changed to a state of FIG. 5C.

Measuring the repetition frequency $f_{rep}$ and/or the CEO frequency $f_{CEO}$ changed at this time by the frequency counters 120 and 130 facilitates obtainment of the absolute frequencies of the optical frequency comb 100, and therefore it is possible to measure the absolute frequency $v_{laser}$ of the laser 150 to be measured without any problems.

Figure 6:
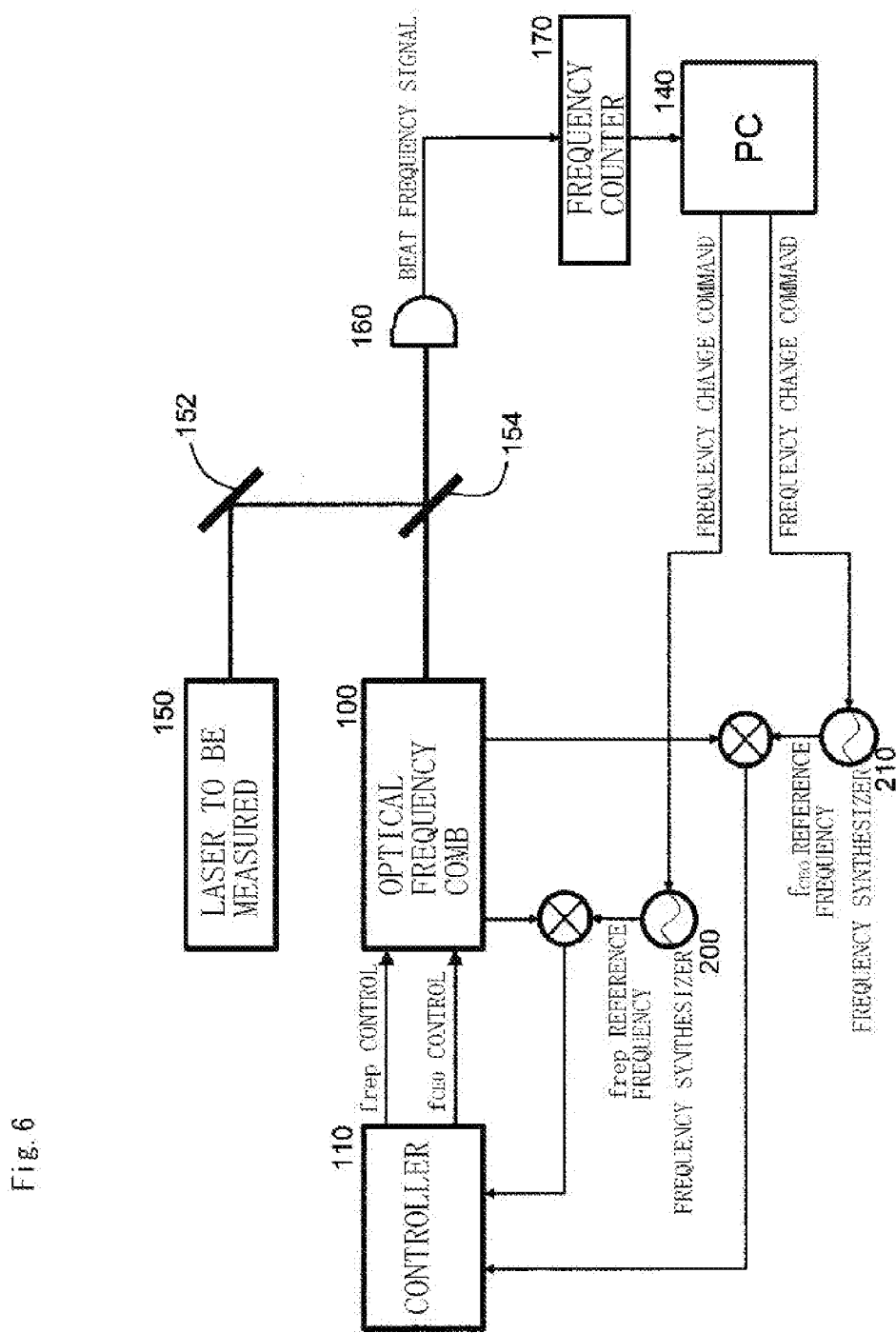
FIG. 6 is a block diagram showing the configuration of a second embodiment of the present invention.

To stabilize the oscillation frequencies of the optical frequency comb, there is a method by which the repetition frequency $f_{rep}$ and/or the CEO frequency $f_{CEO}$ are synchronized in phase to $f_{rep}$ and/or $f_{CEO}$ reference frequencies, respectively, each of which is generated in accordance with the repetition frequency $f_{rep}$ and/or the CEO frequency $f_{CEO}$. In a method for generating the reference frequencies in this case, a frequency synthesizer is used. An input of a highly accurate standard frequency of 10 MHz makes it possible to generate the reference frequencies with great accuracy. Thus, the optical frequency comb that is stabilized by phase synchronization with the reference frequencies constitutes the laser frequency measurement device with high accuracy. FIG. 6 shows a second embodiment of the present invention for realizing this method.

Upon receiving the measurement value of the beat frequency signal, the PC 140 sends a reference frequency change command to frequency synthesizers 200 and/or 210, which generate the $f_{rep}$ or $f_{CEO}$ reference frequencies respectively, so that the beat frequency is controlled to fall within the predetermined frequency range. How to change the repetition frequency $f_{rep}$ and/or the CEO frequency $f_{CEO}$ in accordance with an actual change of the beat frequency $f_B$ is the same as that of the first embodiment.

According to the second embodiment, since the accuracy of frequency stabilization by the phase synchronization is much higher than the accuracy of frequency measurement by the frequency counters, it is possible to perform frequency measurement with higher accuracy than the first embodiment.

Figure 7:
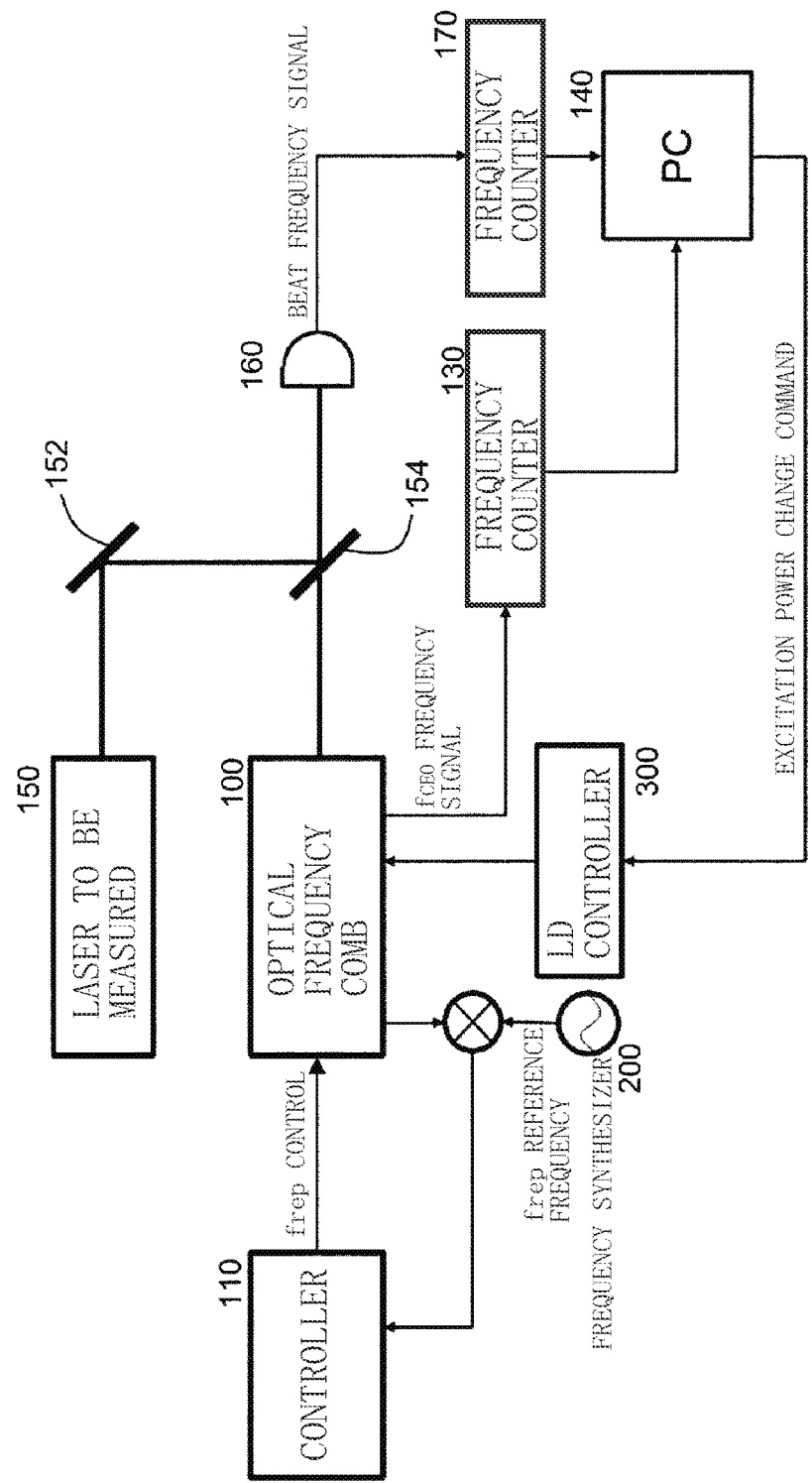
FIG. 7 is a block diagram showing the configuration of a third embodiment of the present invention.

FIG. 7 shows a system configuration that more easily achieves accuracy sufficient for practical use, according to a third embodiment.

An error remaining in stabilization control of the repetition frequency $f_{rep}$ is multiplied by the number "n" of orders thereof. Since "n" is a value of several millions, extremely high accuracy is required of stabilization of the repetition frequency $f_{rep}$. On the contrary, an effect of an error remaining in stabilization control of the CEO frequency $f_{CEO}$ is much smaller than accuracy required for stabilization of the repetition frequency $f_{rep}$. Accordingly, in this embodiment, the repetition frequency $f_{rep}$ is stabilized by phase synchronization with the $f_{rep}$ reference frequency having high accuracy, with the use of the frequency synthesizer 200. On the other hand, the CEO frequency $f_{CEO}$ is controlled by sending a command signal from the PC 140 to an LD controller 300 so that the beat frequency $f_B$ measured by the frequency counter 170 falls within the predetermined range. The frequency counter 130 measures the controlled CEO frequency $f_{CEO}$. If the beat frequency $f_B$ varies due to a variation in the oscillation frequency of the laser 150, the CEO frequency $f_{CEO}$ is changed so as to compensate a variation of the beat frequency $f_B$.

This holds promise of an effect of extending a measurable range $\pm \Delta f_B$ of the beat frequency $f_B$ to a range from $-\Delta f_{CEO}-$ $\Delta f_B$ to $+\Delta f_{CEO}+\Delta f_B$, even with limitations of an $f_{CEO}$ oscillation frequency range of $\pm\Delta f_{CEO}$.

Figure 8:
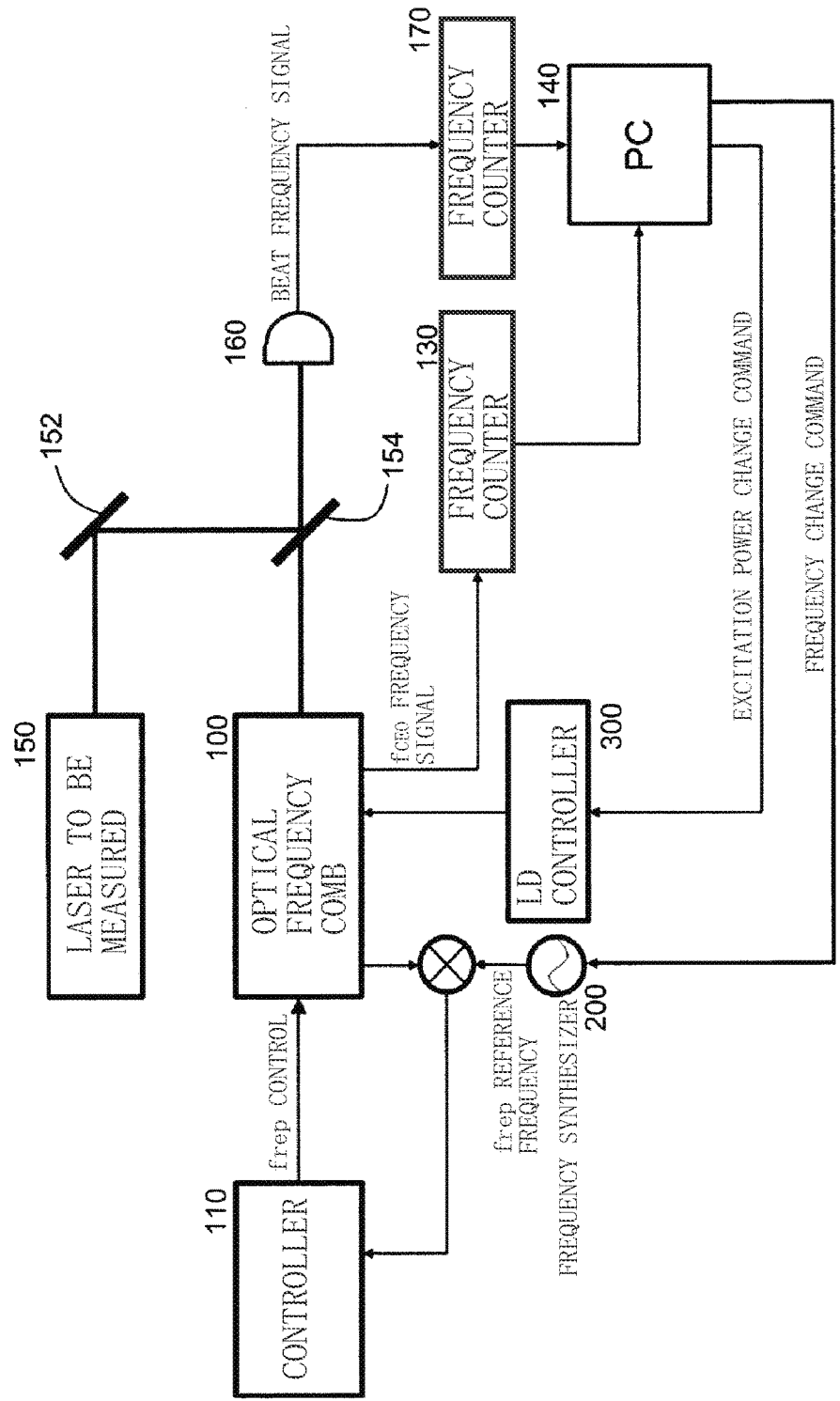
FIG. 8 is a block diagram showing the configuration of a fourth embodiment of the present invention.

Note that, as a fourth embodiment shown in FIG. 8, a method may be combined in which the PC 140 commands the frequency synthesizer 200 to generate the $f_{rep}$ reference frequency, and to change the $f_{rep}$ reference frequency, so that the beat frequency $f_B$ varies. The combination allows measurement of a variable laser frequency in a wide range, out of the range from $-\Delta f_{CEO}-\Delta f_B$ to $+\Delta f_{CEO}+\Delta f_B$.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

What is claimed is:

1. A laser frequency measurement device using an optical frequency comb, for measuring a frequency of a laser by measuring a frequency of a beat signal generated by interference between the optical frequency comb, used as a reference of measurement, and the laser to be measured, the laser frequency measurement device comprising:
    means for generating a frequency change command when the frequency of the beat signal exceeds a predetermined range;
    means for changing a CEO frequency $f_{CEO}$ of the optical frequency comb in response to the frequency change command, such that the frequency of the beat signal becomes a value in the predetermined range;
    means for detecting the beat signal in the predetermined range generated by interference between the laser to be measured and the optical frequency comb including the CEO frequency $f_{CEO}$, the CEO frequency $f_{CEO}$ being changed by the means for changing in response to the frequency change command; and
    means for measuring the frequency of the beat signal in the predetermined range.

2. The laser frequency measurement device using an optical frequency comb according to claim 1, further comprising:
    means for measuring the CEO frequency $f_{CEO}$.

3. The laser frequency measurement device using an optical frequency comb according to claim 2, further comprising means for measuring absolute frequencies $v_{laser}$ of the laser from measurement values of the CEO frequency $f_{CEO}$, and the frequency of the beat signal.

4. The laser frequency measurement device using an optical frequency comb according to claim 2, wherein
    the means for measuring the CEO frequency $f_{CEO}$ measures a change of the CEO frequency $f_{CEO}$ changed in response to the frequency change command, and
    the laser frequency measurement device further comprises means for obtaining an absolute frequency $v_{laser}$ of the optical frequency comb based on the change of the CEO frequency $f_{CEO}$.

5. The laser frequency measurement device using an optical frequency comb according to claim 4, wherein
    the means for determining the oscillation frequency of the laser determines absolute frequencies $v_{laser}$ of the laser from measurement values of the CEO frequency $f_{CEO}$, the frequency of the beat signal in the predetermined range or measured value of the beat signal, and the change of the CEO frequency $f_{CEO}$.

6. The laser frequency measurement device using an optical frequency comb according to claim 1, comprising:
    means for stabilizing the CEO frequency $f_{CEO}$ by phase synchronization with an $f_{CEO}$ reference frequency, which is generated for stabilization of the CEO frequency $f_{CEO}$; and
    means for changing the $f_{CEO}$ reference frequency such that the frequency of the beat signal becomes the value in the predetermined range.

7. The laser frequency measurement device using an optical frequency comb according to claim 6, comprising:
    means for generating the reference frequencies by using a frequency synthesizer.

8. The laser frequency measurement device using an optical frequency comb according to claim 1, comprising:
    means for measuring the CEO frequency $f_{CEO}$; and
    means for changing the CEO frequency $f_{CEO}$ such that the frequency of the beat signal becomes the value in the predetermined range.

9. The laser frequency measurement device using an optical frequency comb according to claim 1, wherein
    the predetermined range is a frequency range in which the frequency of the beat signal is able to be measured.

10. The laser frequency measurement device using an optical frequency comb according to claim 1, wherein
    the predetermined range is a band of a band pass filter.

11. The laser frequency measurement device using an optical frequency comb according to claim 10, wherein
    the frequency of the beat signal is changed to a center of the band of the band pass filter by changing the CEO frequency $f_{CEO}$ of the optical frequency comb in response to the frequency change command.

* * * * *